(12) United States Patent
Domahidy

(10) Patent No.: US 7,934,739 B2
(45) Date of Patent: May 3, 2011

(54) BICYCLE REAR SUSPENSION

(75) Inventor: Steve Domahidy, Denver, CO (US)

(73) Assignee: Niner, Inc., North Hollywood, CA (US)

( * ) Notice: Subject to any disclaimer, the term of this patent is extended or adjusted under 35 U.S.C. 154(b) by 256 days.

(21) Appl. No.: 12/116,077

(22) Filed: May 6, 2008

(65) Prior Publication Data

US 2009/0026728 A1      Jan. 29, 2009

Related U.S. Application Data

(60) Provisional application No. 60/952,473, filed on Jul. 27, 2007.

(51) Int. Cl.
*B62K 3/00* (2006.01)
(52) U.S. Cl. ......... 280/284; 280/283; 280/288; 280/275
(58) Field of Classification Search .................. 280/283, 280/288, 275, 284, 124.1
See application file for complete search history.

(56) References Cited

U.S. PATENT DOCUMENTS

| | | | | |
|---|---|---|---|---|
| 411,035 | A | * | 9/1889 | Jeffery .......................... 280/264 |
| 463,710 | A | * | 11/1891 | Mathews ...................... 280/275 |
| 4,789,174 | A | | 12/1988 | Lawwill |
| 5,121,937 | A | | 6/1992 | Lawwill |
| 5,205,572 | A | * | 4/1993 | Buell et al. .................... 280/284 |
| 5,217,241 | A | | 6/1993 | Girvin |
| 5,244,224 | A | | 9/1993 | Busby |
| 5,306,036 | A | | 4/1994 | Busby |
| 5,335,929 | A | | 8/1994 | Takagaki et al. |
| 5,370,411 | A | | 12/1994 | Takamiya et al. |
| 5,409,249 | A | | 4/1995 | Busby |
| 5,441,292 | A | | 8/1995 | Busby |
| 5,452,910 | A | * | 9/1995 | Harris ........................... 280/284 |
| 5,474,318 | A | | 12/1995 | Castellano |
| 5,509,679 | A | | 4/1996 | Leither |
| 5,553,881 | A | * | 9/1996 | Klassen et al. ................ 280/284 |
| 5,628,524 | A | | 5/1997 | Klassen et al. |
| 5,678,837 | A | | 10/1997 | Leither |
| 5,791,674 | A | | 8/1998 | D'Aluisio et al. |
| 5,899,480 | A | | 5/1999 | Leither |
| 5,957,473 | A | | 9/1999 | Lawwill |
| 6,056,307 | A | | 5/2000 | Busby et al. |
| 6,076,845 | A | | 6/2000 | Lawwill et al. |
| 6,099,010 | A | | 8/2000 | Busby |
| 6,102,421 | A | | 8/2000 | Lawwill et al. |
| 6,161,858 | A | | 12/2000 | Tseng |
| 6,199,886 | B1 | | 3/2001 | Guenther |

(Continued)

OTHER PUBLICATIONS

"Niner Bikes R.I.P. 9 Full Suspension 29 er," Guitar Ted, http://www.thebikinghub.com/mtb/niner-bikes-rip-9-full-suspension-29er/, Updated Apr. 18, 2006, pp. 1-7, Accessed May 12, 2008.

*Primary Examiner* — Joanne Silbermann
*Assistant Examiner* — Maurice Williams
(74) *Attorney, Agent, or Firm* — Alleman Hall McCoy Russell & Tuttle LLP

(57) ABSTRACT

A twenty-nine inch wheel bicycle frame includes substantially rigid front and rear triangles that are pivotally connected to one another by a pair of linkages. The frame is designed so that chain tension urges the linkages to pivot in opposite directions, while bumps urge the linkages to pivot in the same direction.

18 Claims, 8 Drawing Sheets

U.S. PATENT DOCUMENTS

| | | | |
|---|---|---|---|
| 6,203,042 B1 | 3/2001 | Wilcox | |
| 6,378,885 B1 | 4/2002 | Ellsworth et al. | |
| 6,439,593 B1 | 8/2002 | Tseng | |
| 6,471,230 B2 | 10/2002 | Ellsworth et al. | |
| 6,595,538 B2 | 7/2003 | Ellsworth et al. | |
| 6,619,684 B2 | 9/2003 | Miyoshi | |
| 6,843,494 B2 | 1/2005 | Lam | |
| 6,880,847 B2 | 4/2005 | Chamberlain et al. | |
| 6,926,298 B2 | 8/2005 | Ellsworth et al. | |
| 7,048,292 B2 | 5/2006 | Weagle | |
| 7,066,481 B1 * | 6/2006 | Soucek | 280/284 |
| RE39,159 E | 7/2006 | Klassen | |
| 7,128,329 B2 | 10/2006 | Weagle | |
| 7,556,276 B1 * | 7/2009 | Dunlap | 280/284 |
| 7,566,066 B2 * | 7/2009 | Chang et al. | 280/284 |
| 2003/0038450 A1 | 2/2003 | Lam | |
| 2003/0160421 A1 | 8/2003 | Assier | |
| 2003/0193162 A1 | 10/2003 | Ellsworth et al. | |
| 2004/0145149 A1 | 7/2004 | Ellsworth et al. | |
| 2005/0046142 A1 | 3/2005 | Chamberlain et al. | |
| 2005/0067809 A2 | 3/2005 | Chamberlain et al. | |
| 2005/0067810 A1 * | 3/2005 | Weagle | 280/284 |
| 2005/0253357 A1 * | 11/2005 | Chang et al. | 280/283 |
| 2005/0285367 A1 * | 12/2005 | Chang et al. | 280/284 |
| 2006/0022429 A1 | 2/2006 | Ellsworth et al. | |
| 2006/0119070 A1 * | 6/2006 | Weagle | 280/284 |
| 2006/0181053 A1 | 8/2006 | Huang et al. | |
| 2007/0108725 A1 | 5/2007 | Graney | |
| 2007/0246909 A1 * | 10/2007 | Weng | 280/284 |

* cited by examiner

BICYCLE REAR SUSPENSION

CROSS REFERENCE TO RELATED APPLICATIONS

This application claims priority to U.S. Provisional Patent Application No. 60/952,473, filed Jul. 27, 2007, the entire contents of which are hereby incorporated herein by reference for all purposes.

BACKGROUND

Some bicycles include a rear suspension to improve rider comfort as the bicycle travels over an uneven riding surface. A rear suspension may include one or more pivot points and a cooperating shock-absorbing mechanism that cooperate to dampen the jarring effects that small and large bumps can have on a rider. While bump damping may improve rider comfort, prior suspension designs have undesirably wasted rider energy by bobbing in response to pedaling. Prior suspension designs have also decreased the handling characteristics of bicycles in certain situations, such as during braking.

SUMMARY

A twenty-nine inch wheel bicycle frame includes a rear suspension designed to reduce energy-wasting pedal bob. The bicycle includes substantially rigid front and rear triangles that are pivotally connected to one another by a pair of linkages. The frame is designed so that chain tension urges the linkages to pivot in opposite directions, while bumps urge the linkages to pivot in the same direction.

WRITTEN DESCRIPTION

The present disclosure is directed to a bicycle having a rear suspension. While suitable for use with a variety of different bicycles, the suspension is particularly well suited for use with mountain bikes having twenty-nine inch wheels.

Figure 1:
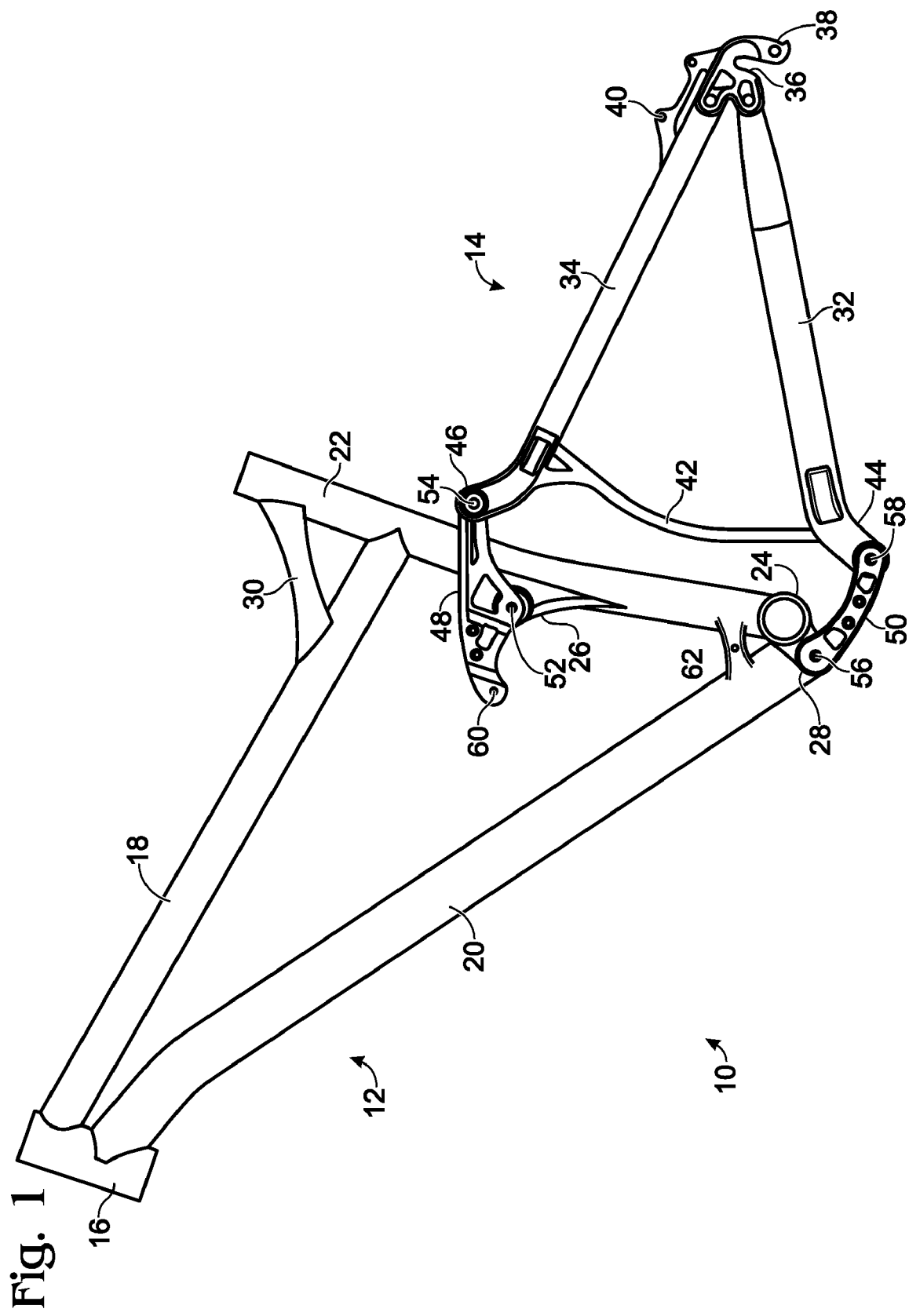
FIG. 1 shows an uncompressed bicycle frame having a suspension in accordance with an embodiment of the present disclosure.

FIG. 1 shows an exemplary twenty-nine inch wheel bicycle frame 10 in accordance with the present disclosure. Bicycle frame 10 includes a front triangle 12 and a rear triangle 14. In the illustrated embodiment, front triangle 12 includes a head tube 16, a top tube 18, a down tube 20, a seat tube 22, a bottom bracket shell 24, a top linkage support 26, and a bottom linkage support 28. The front triangle also includes a strengthening member 30 extending between the back of top tube 18 and the top of seat tube 22. The strengthening member allows the top tube to be connected to an intermediate portion of the seat tube, thus decreasing the stand-over height of the top tube.

Front triangle 12 is substantially rigid. In other words, there are no pivots that allow relative movement between the head tube, bottom bracket shell, the top of the seat tube, and the top and bottom linkage supports. The flexibility of the material used to make the front triangle, if any, provides the only movement.

The rear triangle includes forked chain stays 32, forked seat stays 34, drop outs 36, a derailleur hanger 38, a disk brake mount 40, bridge stays 42, a bottom linkage support 44, and a top linkage support 46. Like the front triangle, the rear triangle is substantially rigid. In other words, there are no pivots that allow relative movement between the drop outs and the top and bottom linkage supports.

The front and rear triangles can be differently configured while remaining within the scope of this disclosure. As a nonlimiting example, the front triangle need not include a conventional top tube, down tube, and seat tube, but rather can include a unified member that extends from a central position to the vertices of a triangle to support the head tube, seat post, and bottom bracket.

As is well understood in the art of bicycle design, bottom bracket shell 24 can hold a bottom bracket, which allows a crank assembly to rotate relative to the frame. The crank assembly can be attached to pedals, which a rider can use to rotate the crank assembly. The crank assembly also can be attached to one or more chainrings. The rear dropouts can be used to hold a rear wheel, which may include one or more cogs. A chain can extend from the chainrings to the cogs, so that a rider pedaling the crank assembly can drive the chain extending between the chainrings and the cogs, thus causing the rear wheel to rotate. In embodiments that include two or more chainrings, a front derailleur may be used to move the chain from one chainring to another. Similarly, in embodiments that include two or more cogs, a rear derailleur can be used to move the chain from one cog to another. In this way, the gearing of the bicycle can be changed.

The front triangle is moveably connected to the rear triangle by top linkage 48 and bottom linkage 50. The top linkage is pivotally connected to the top linkage support of the front triangle by a top-front pivot 52. The top linkage is also pivotally connected to the top linkage support of the rear triangle by a top-rear pivot 54. Similarly, the bottom linkage is pivotally connected to the bottom linkage support of the front triangle by a bottom-front pivot 56, and the bottom linkage is pivotally connected to the bottom linkage support of the rear triangle by a bottom-rear pivot 58. In some embodiments, the pivots may include bearings and/or bushings to facilitate low-friction pivoting.

The top linkage may also include a shock pivot 60 and the front triangle may include a shock support 62. A shock, spring, or the like may be connected between the shock pivot and the shock support to provide desired bump compliance and/or damping as the suspension compresses.

The rear triangle is sized to accommodate a twenty-nine inch mountain bike wheel, and the front triangle is sized to accommodate a front fork designed to accommodate a twenty-nine inch front wheel (wheels omitted from drawings for clarity). Twenty-nine inch mountain bike wheels have a larger diameter than the more customary twenty-six inch mountain bike wheels. Because of the relatively large wheels of a twenty-nine inch wheel bicycle, special design considerations must be made when designing a twenty-nine inch wheel mountain bike frame. Simply transferring design principles from a twenty-six inch wheel mountain bike frame to a twenty-nine inch wheel mountain bike frame will produce undesirable results.

The inventor herein has recognized that some of the design challenges associated with twenty-nine inch wheels include limiting the length of the wheelbase while maintaining favorable steering characteristics and keeping top-tube stand-over height relatively low. The inventor has also recognized that another significant design challenge is implementing a rear suspension that provides good small and large bump compliance while limiting undesirable pedal-bob and suspension-induced pedal kickback. It is particularly difficult to design such a suspension without sacrificing favorable handling characteristics with compromised frame geometries and dimensions.

The same rear suspension that works on a twenty-six inch wheel mountain bike will not work on a twenty-nine inch wheel mountain bike because the relative position between the rear dropout and the bottom bracket shell is different on a twenty-nine inch wheel bike compared to a twenty-six inch wheel bike. Because the twenty-nine inch wheels are relatively large, the rear axle is further above the ground than with a twenty-six inch wheel. Therefore, the dropout that holds the axle is also further above the ground. However, it is desirable to keep the bottom bracket low to the ground, because this helps keep the rider's center of mass low. As such, the bottom bracket height relative to the rear dropout on the herein disclosed twenty-nine inch wheel mountain bike may be lower than on conventional twenty-six inch wheel mountain bikes.

The difference in bottom bracket position relative to the rear dropout directly affects the angle of the chain that extends between the chainrings and the cogs. Because the chain extends between the front of the bicycle and the rear of the bicycle, tension on the chain can influence movement of the front of the bicycle relative to the rear of the bicycle in a rear suspension bicycle. In other words, depending on the linkage used to connect the front of the bicycle to the rear of the bicycle, chain tension caused by pedaling can urge the rear suspension up or down, or lock the suspension so that it does not move up or down. The different chain angles of a twenty-nine inch wheel mountain bike compared to a twenty-six inch wheel mountain bike render the suspension designs of twenty-six inch wheel mountain bikes unsuitable for use with twenty-nine inch wheel mountain bikes.

It is desirable for the rear suspension to actively respond to bumps without being negatively impeded by pedal-induced chain tension. At the same time, it is desirable for the suspension to limit pedal-induced bobbing, which wastes rider energy. Bicycle frame 10 of FIG. 1 overcomes such challenges, in part, with the illustrated dual-linkage suspension. The illustrated suspension is based on two linkages rotating in the same direction responsive to bump forces. Top linkage 48 pivots from roughly around the middle of seat tube 22 and attaches to the rear triangle near the top of seat stays 34. Bottom pivot 50 is located under bottom bracket shell 24, with bottom-front pivot 56 located both forward of and lower than an axle of the bottom bracket. Bottom linkage 50 attaches to rear triangle 14 at a point that is lower than chain stays 32.

The illustrated relationship of the pivots above and below the bottom bracket, when placed at the correct angle, can mitigate potentially negative effects of chain tension. For example, with reference to FIG. 2, this is particularly true when chain tension is directed roughly at an intersection of a line A passing through top-front pivot 52 and top-rear pivot 54 and a line B passing through bottom-front pivot 56 and bottom-rear pivot 58. This point is labeled X in FIG. 2, and can be referred to as the focus of a constantly varying arc. As can be seen by comparing FIGS. 1-6, the focus of the constantly varying arc moves as the suspension becomes compressed.

Chain tension urges the top linkage in a counter-clockwise rotation (suspension up) and the bottom linkage in a clockwise rotation (suspension down). However, the unified construction of rear triangle 14, including the rigid support of bridge stays 42, prevents the linkages from rotating opposite one another. Selecting pivot points that allow chain tension to be directed near the focus of the constantly varying arc helps lock out pedal induced suspension movement. When aligned in this manner, the chain force attempts to move the lower link down and the upper link up. The opposing forces at least partially negate one another, thus limiting pedal bob that may otherwise result from chain tension.

However, while chain tension attempts to move the linkages in opposite directions, bump forces urge the linkages in the same direction. As such, the suspension can remain fully active to bump forces while the dual linkage design helps mitigate adverse effects from chain tension.

As described above, the focus of the constantly varying arc is determined by the relative angles of the top and bottom linkages. The focus of the constantly varying arc moves throughout suspension compression because the angles of the top and bottom linkages change as the suspension compresses. The focus of the constantly varying arc at any level of suspension compression can be altered by altering the angle of at least one of the top and bottom linkage. This can be done by changing the frame design. In the illustrated embodiment, the angles of the top and bottom linkage are set so that when the suspension is compressed due to rider sag (approximately 25% compression), the focus of the constantly varying arc is approximately inline with a chain line C extending from the middle chainring to the middle cog of the bicycle. This principle can be used to set the linkage angles for bicycle frames with varying geometries and/or levels of suspension travel. In other words, a bicycle having a different bottom bracket height and/or more or less suspension travel can be designed in accordance with the present disclosure by selecting the linkage angles so that the chain line of a desired gear is approximately inline with the focus of the constantly varying arc when the suspension is compressed with rider sag. Furthermore, it should be understood that the level of compression associated with rider sag can be selected based on any number of different factors, and need not be 25% compression in all embodiments.

The angles of the top and bottom linkages are selected based on a number of different factors, including, but not limited to, degree of total suspension travel, degree of intended suspension travel caused by rider sag, bottom bracket height, and the desired gearing to which the suspension will be optimized. The bicycle frame illustrated in FIGS. 1-9 is a nonlimiting example of a bicycle frame that implements the above described principles. While specific linkage lengths and angles are provided as examples below, it should be understood that these are only examples. Other frames can be designed with other angles according to the above described principles without departing from the scope of this disclosure.

In the illustrated embodiment, at 0% compression the top linkage is angled approximately 20 degrees relative to a horizontal reference (e.g., the ground when a fully built-up bicycle is resting on the ground). The bottom linkage is angled approximately 30 degrees relative to a horizontal reference. Although a frame can be designed with other linkage arrangements without departing from the scope of this disclosure, it has been found that the above described angles, in combination with the location of the pivot points relative to the chain, provide the desired suspension attributes for the illustrated frame, which is designed for approximately 4.5 inches of suspension travel.

The length of the top linkage and the bottom linkage can be selected to provide a desired amount of rear suspension travel. In the illustrated embodiment, the top and bottom linkage are the same length, as measured from the pivot points at which they connect to the front and rear triangles. The linkages are each approximately 9 centimeters, and collectively provide for approximately 4.5 inches of suspension travel. Using linkages that have equal lengths helps provide a favorable wheel path throughout suspension compression, as described in more detail below. Positioning the bottom-front pivot in front of and below the bottom bracket axle allows the bottom linkage to be sufficiently long to provide adequate suspension travel and a desired rear-axle path, without undesirably extending the wheelbase of the bicycle. As best shown in FIGS. 5, 7, 8, and 9, the top linkage and the top-rear pivot is forked so that top-rear pivot 54 is able to rotate in front of the seat tube when the suspension is compressed. This design feature also allows the axle to take a desired path without negatively affecting wheelbase and/or suspension travel.

The axle path of the rear axle (as defined by the rear drop outs), has a significant impact on suspension effectiveness. The axle path of the illustrated rear suspension design follows a constantly varying arc, labeled AP in FIG. 6.

Figure 2:
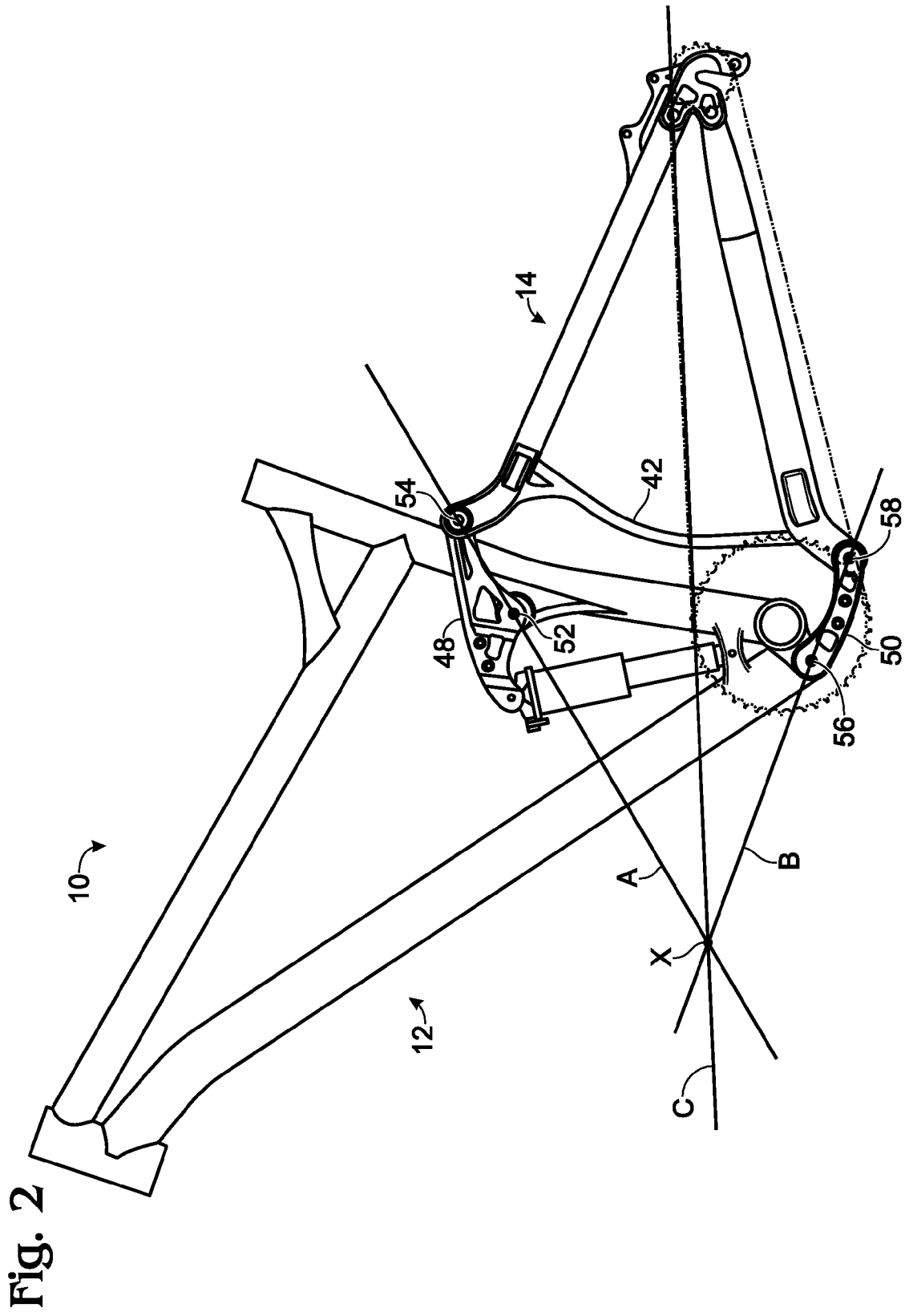
FIG. 2 shows the bicycle frame of FIG. 1 approximately 25% compressed.
Figure 3:
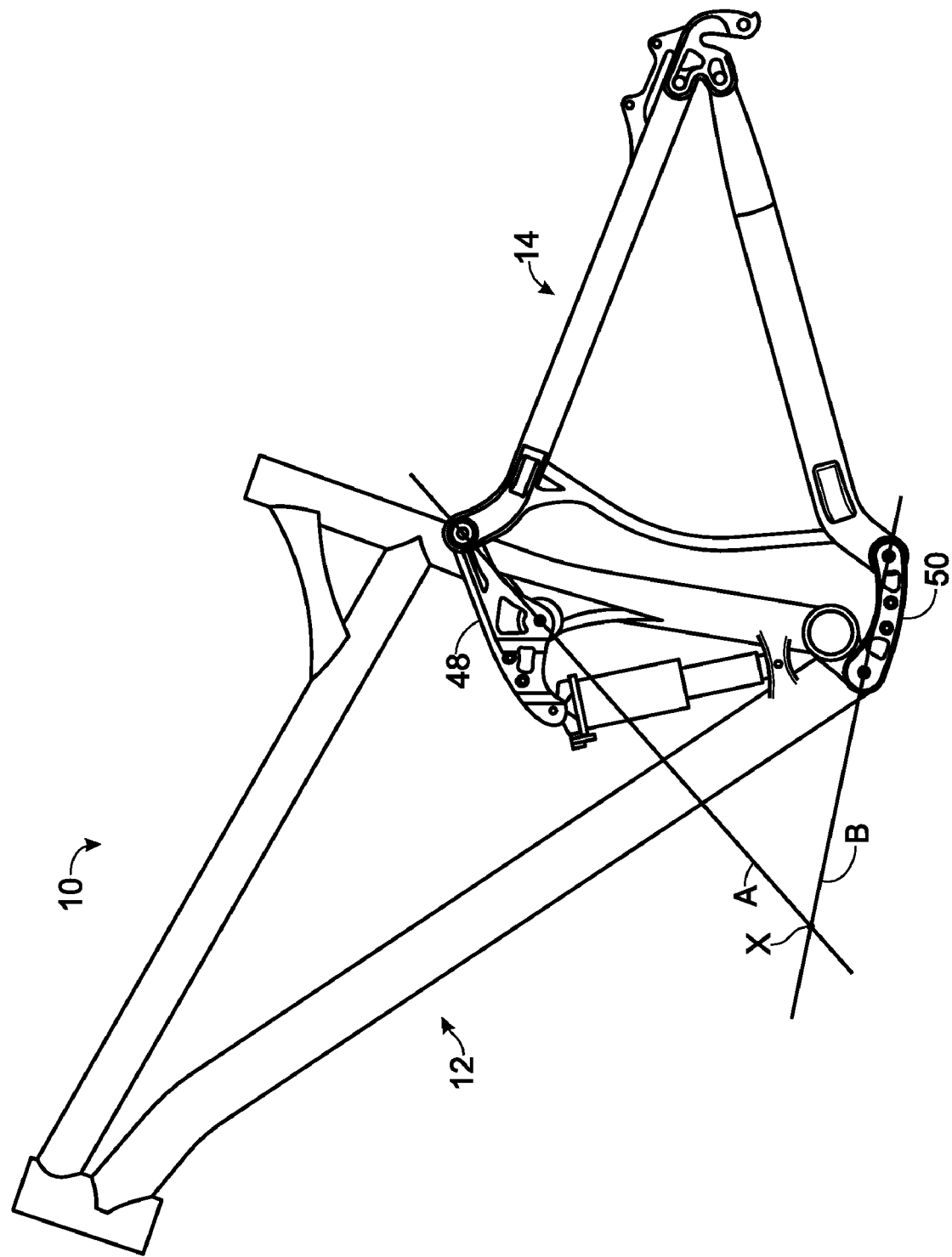
FIG. 3 shows the bicycle frame of FIG. 1 approximately 50% compressed.
Figure 4:
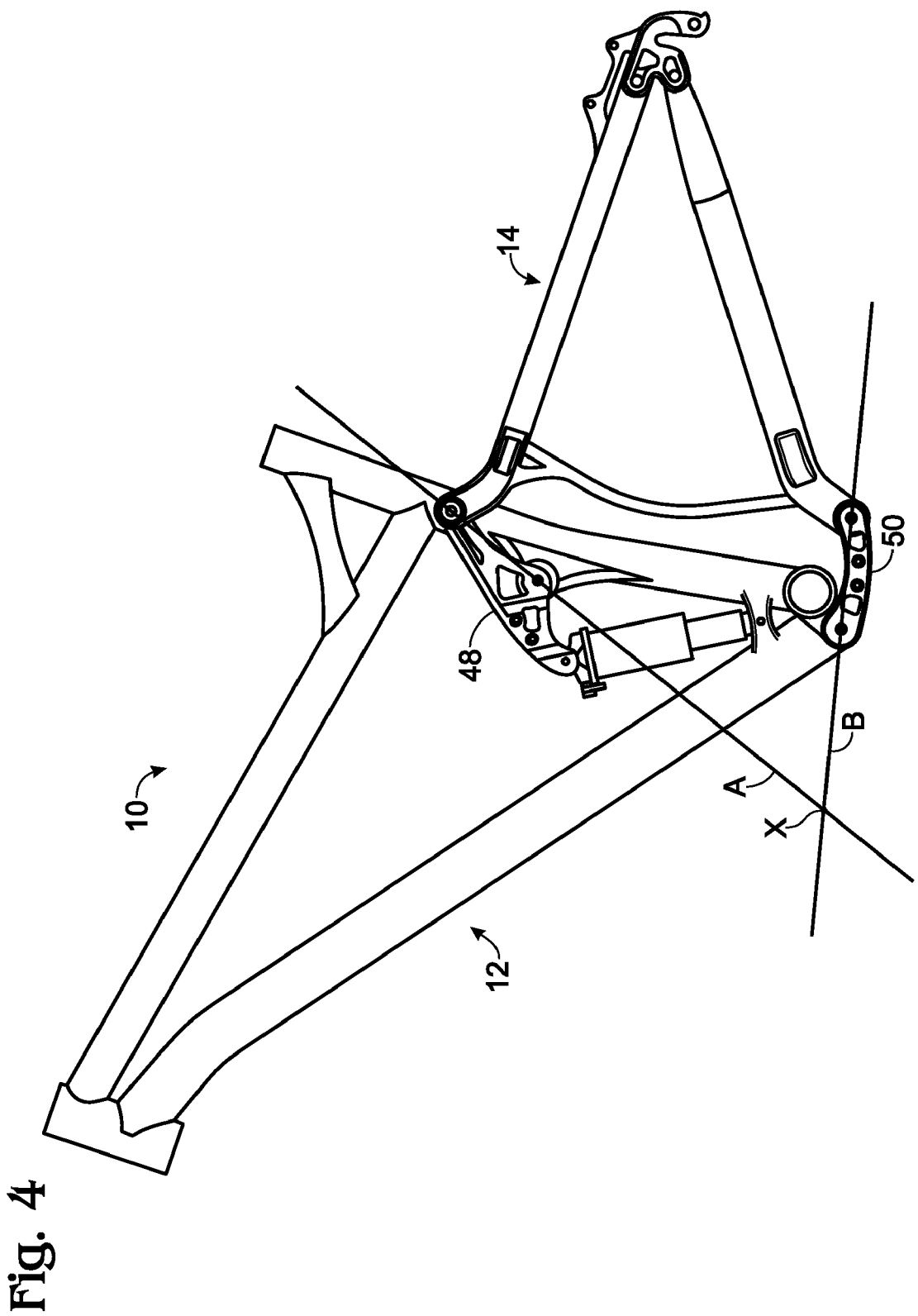
FIG. 4 shows the bicycle frame of FIG. 1 approximately 75% compressed.
Figure 5:
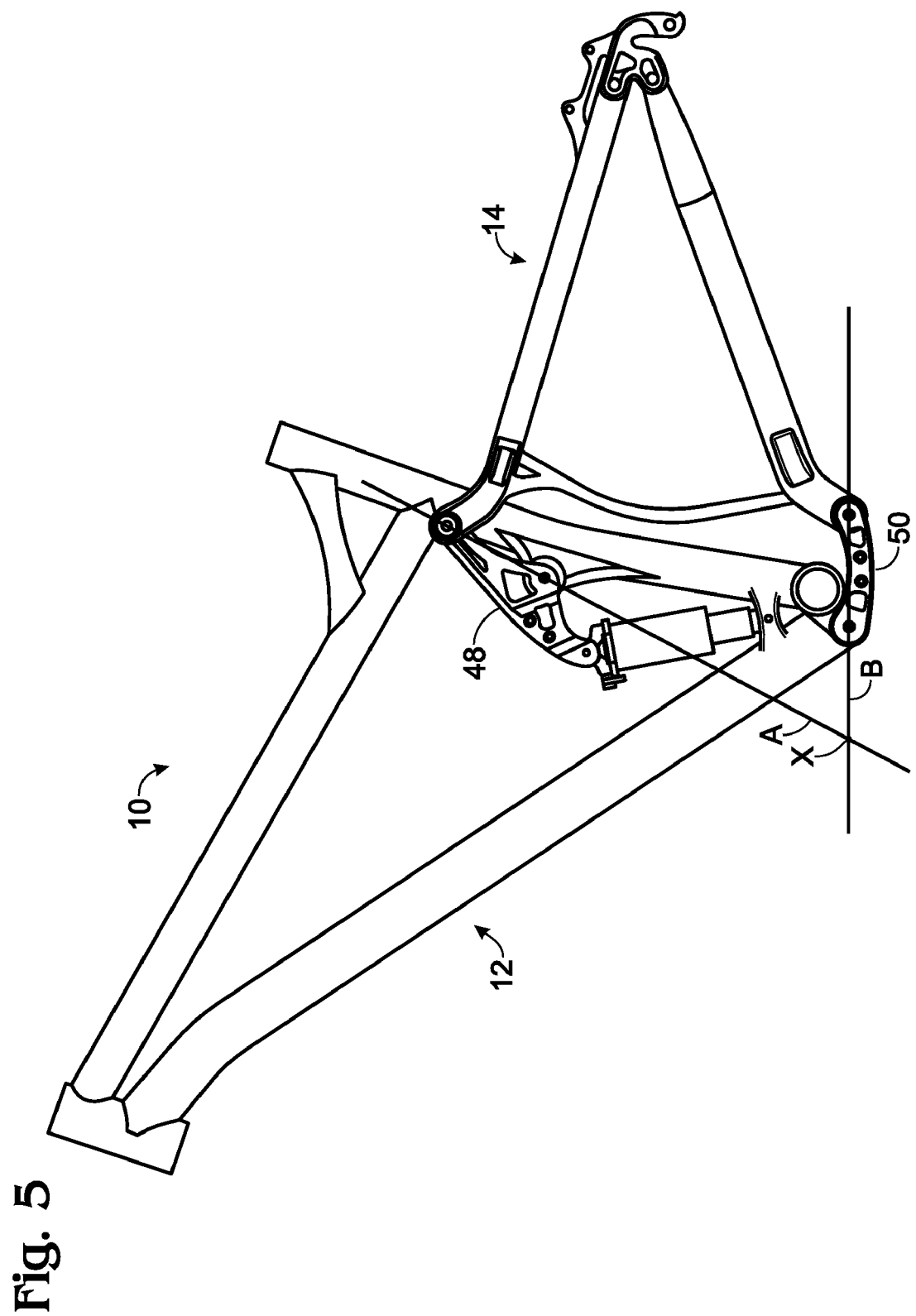
FIG. 5 shows the bicycle frame of FIG. 1 approximately 100% compressed.
Figure 6:
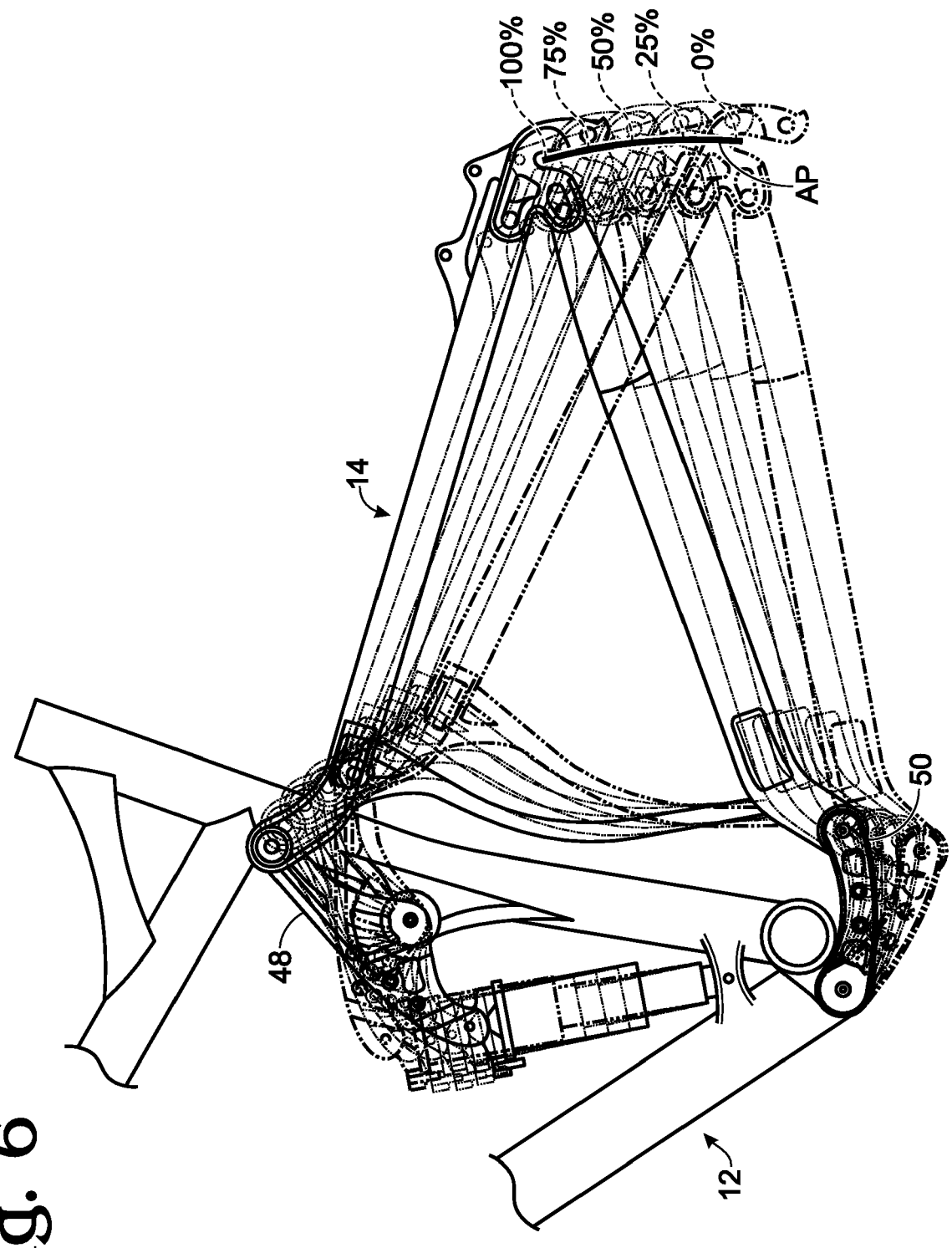
FIG. 6 shows the bicycle frame of FIG. 1 in a range of positions from approximately 0% compressed to 100% compressed.
Figure 7:
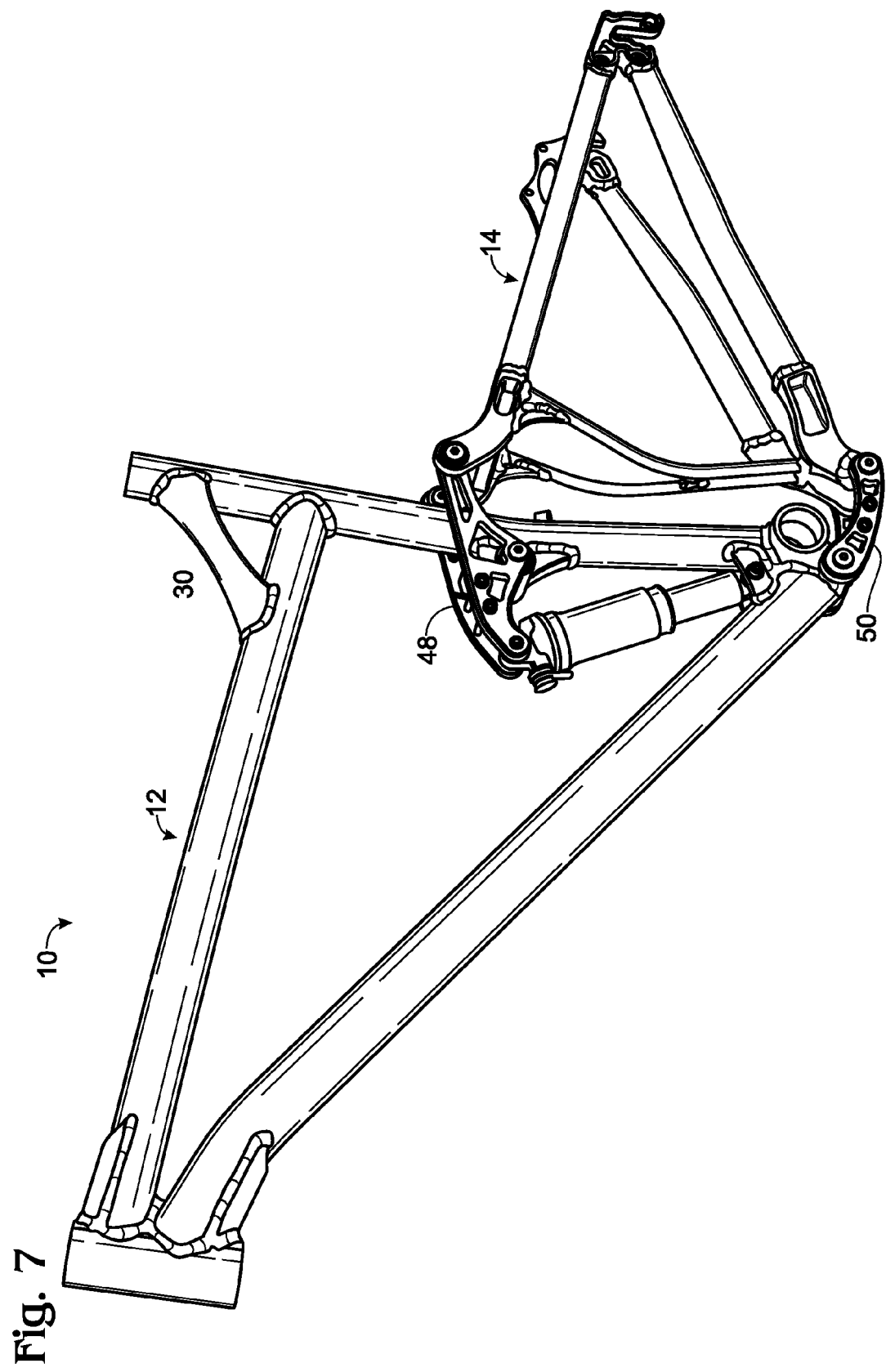
FIG. 7 shows a bicycle frame having a suspension in accordance with an embodiment of the present disclosure.
Figure 9:
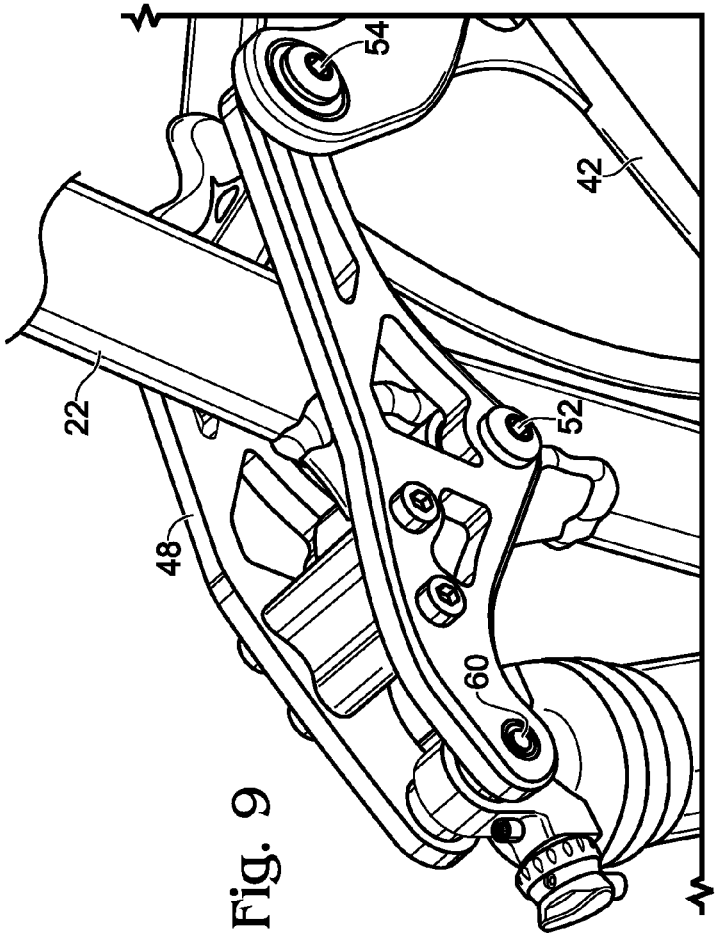
FIG. 9 shows the top linkage of a bicycle frame having a suspension in accordance with an embodiment of the present disclosure.
Figure 8:
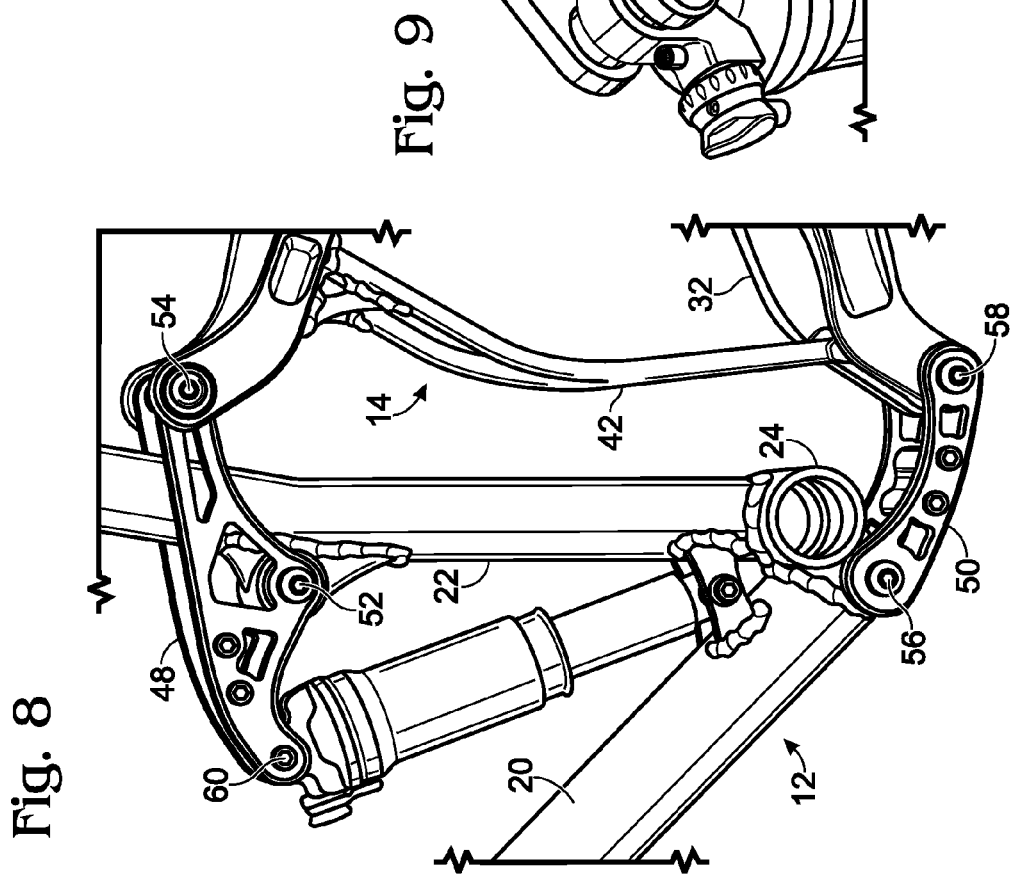
FIG. 8 shows the top and bottom linkages of a suspension in accordance with an embodiment of the present disclosure.

With 0% compression, the axle position is at its lowest point relative to the bottom bracket. As the suspension begins to compress, the axle moves back and away from the bottom bracket, while at the same time rising up relative the bottom bracket. This rearward arc path happens in the initial part of travel, and the axle is at its rearward most position at approximately 25% to 30% compression, as shown in FIG. 2. It should be noted that most shocks, springs, and/or other dampeners are designed to be approximately 25% to 30% compressed with rider sag (i.e., the compression of the suspension that results from the weight of the rider). The illustrated suspension is designed so that the rearward most position along the axle path substantially corresponds with the rider sag.

The initial part of the axle path during suspension travel extends rearward from 0% to approximately 20%. The axle path travels substantially vertically for a portion of the travel, particularly between about 20%-30% compression. The vertical portion of the arc gives the bike very favorable small bump compliance while limiting pedal induced bob. For example, if the chain is pulling on the wheel while the wheel is in its most rearward position and in the portion of its arc with the most vertical path, chain force is less likely to lock out the suspension or otherwise negatively affect small bump compliance.

After approximately 30% of compression, the axle path begins to move back inward, toward the seat tube, at an increasing rate. The further the axle travels, the more it moves toward the front of the bike. Because of the relative locations of the pivots, the bottom bracket, and the rear dropouts, the distance between the chainrings and the cogs remains substantially constant as the suspension compresses beyond approximately 30%. As such, there is substantially no chain growth after the initial chain growth resulting from rider sag. Chain growth can be described as an increase in the effective distance between the chainrings and the cogs as the suspension compresses. The growth in the chain before approximately 25% compression does not negatively affect the present suspension design, because the suspension is typically always compressed approximately 25% due to rider weight. By avoiding chain growth throughout the bump absorbing portion of compression (i.e., approximately 25% to 100%), suspension kick back at the pedals can be limited, if not avoided altogether.

In direct contrast to the present design, some bikes, such as high pivot and/or single pivot bikes, have significant chain growth. In such designs, compression of the suspension forces the crank assembly to rotate backwards because of the increased length of chain required to span between the chainrings and the cogs. This lengthening of the chain means that under heavy torque, the suspension will have a difficult time overcoming the chain torque, and will not move very well. When the suspension moves during coasting, it can kick the pedals backward, providing undesirable pedal feedback to the rider.

While the present invention has been described in terms of specific embodiments, it should be appreciated that the spirit and scope of the invention is not limited to those embodiments. Furthermore, the above disclosure uses relative terms for position and orientation. For example, front, rear, top, bottom, up, down, clockwise, counter-clockwise, and the like are used to describe the illustrated bicycle frame. It should be understood that these terms are used in relation to how the bicycle frame is drawn in the figures, and that other terms may be appropriate when looking at the bicycle frame from a different perspective. Furthermore, it should be understood that "twenty-nine inch wheels," "twenty-nine inch frame," and "twenty-nine inch bicycle" are terms of art. Twenty-nine inch wheels are sometimes referred to as 700c or ISO 622 mm wheels. Twenty-nine inch rims actually have a diameter of approximately 24.5" (622 mm) and the average twenty-nine inch mountain bike tire has an outside diameter of approximately 28.9" (735 mm), though tires exist with diameters of over 750 mm. Twenty-nine inch wheels are larger than twenty-six inch mountain bike wheels, which typically are ISO 559 mm wheels, with a rim diameter of approximately 22.0" (559 mm) and an outside tire diameter of approximately 26.2" (665 mm). As used herein, twenty-nine inch frames are frames that are sized and configured to accommodate twenty-nine inch wheels.

The invention claimed is:

1. A twenty-nine inch wheel bicycle frame, comprising:
a substantially rigid front triangle;
a substantially rigid rear triangle sized to accommodate a twenty-nine inch wheel;
a top linkage pivotally connected to the front triangle at a top-front pivot point and pivotally connected to the rear triangle at a top-rear pivot point; and
a bottom linkage pivotally connected to the front triangle at a bottom-front pivot point and pivotally connected to the rear triangle at a bottom-rear pivot point, an effective length of the bottom linkage being substantially equal to an effective length of the top linkage;
wherein the top-front, top-rear, bottom-front, and bottom-rear pivot points are positioned such that:
chain tension urges the top linkage and the bottom linkage to pivot in opposite directions;
bumps urge the top linkage and the bottom linkage to pivot in a same direction; and
the top and bottom linkage cooperate to direct a rear dropout in an arc characterized by chain growth throughout approximately a first 25% of suspension compression and characterized by an absence of chain growth throughout approximately a last 75% of suspension compression.

2. The twenty-nine inch wheel bicycle frame of claim 1, wherein the top linkage is angled approximately 20 degrees relative to a horizontal reference when a suspension including at least the top linkage and the bottom linkage is 0% compressed.

3. The twenty-nine inch wheel bicycle frame of claim 1, wherein the bottom linkage is angled approximately 30 degrees relative to a horizontal reference when a suspension including at least the top linkage and the bottom linkage is 0% compressed.

4. The twenty-nine inch wheel bicycle frame of claim 1, wherein the top linkage rotates such that the top-rear pivot point extends past the front triangle when a suspension including at least the top linkage and the bottom linkage is 100% compressed.

5. The twenty-nine inch wheel bicycle frame of claim 1, wherein the bottom linkage extends under a bottom bracket shell of the front triangle.

6. The twenty-nine inch wheel bicycle frame of claim 5, wherein the bottom-front pivot point is positioned in front of and below the bottom bracket shell.

7. The twenty-nine inch wheel bicycle frame of claim 1, wherein the substantially rigid front triangle includes a head tube, a top tube, a down tube, a seat tube, a bottom bracket shell, and a strengthening member extending between a back portion of the top tube and a top portion of the seat tube.

8. A twenty-nine inch wheel bicycle frame, comprising:
a substantially rigid front triangle;
a substantially rigid rear triangle sized to accommodate a twenty-nine inch wheel; and
a top linkage and a bottom linkage cooperating to pivotally connect the front triangle to the rear triangle such that chain tension urges the top linkage and the bottom linkage to pivot in opposite directions, bumps urge the top linkage and the bottom linkage to pivot in a same direction, and the top and bottom linkage cooperate to direct a rear dropout in an arc characterized by an absence of chain growth throughout at least approximately a last 75% of suspension compression, wherein the bottom linkage extends under a bottom bracket shell of the front triangle and connects to the front triangle in front of and below the bottom bracket shell.

9. The twenty-nine inch wheel bicycle frame of claim 8, wherein the top linkage is angled approximately 20 degrees relative to a horizontal reference when a suspension including at least the top linkage and the bottom linkage is 0% compressed.

10. The twenty-nine inch wheel bicycle frame of claim 8, wherein the bottom linkage is angled approximately 30 degrees relative to a horizontal reference when a suspension including at least the top linkage and the bottom linkage is 0% compressed.

11. The twenty-nine inch wheel bicycle frame of claim 8, wherein the top linkage rotates such that a portion of the rear triangle extends past a portion of the front triangle when a suspension including at least the top linkage and the bottom linkage is 100% compressed.

12. The twenty-nine inch wheel bicycle frame of claim 8, wherein the substantially rigid front triangle includes a head tube, a top tube, a down tube, a seat tube, a bottom bracket shell, and a strengthening member extending between a back portion of the top tube and a top portion of the seat tube.

13. A twenty-nine inch wheel bicycle, comprising:
a substantially rigid front triangle;
a front fork rotatably held by the substantially rigid front triangle and sized to accommodate a twenty-nine inch front wheel;
a twenty-nine inch front wheel rotatably held by the front fork;
a substantially rigid rear triangle sized to accommodate a twenty-nine inch rear wheel;
a twenty-nine inch rear wheel rotatably held by the rear triangle;
a top linkage pivotally connected to the front triangle at a top-front pivot point and pivotally connected to the rear triangle at a top-rear pivot point; and
a bottom linkage pivotally connected to the front triangle at a bottom-front pivot point and pivotally connected to the rear triangle at a bottom-rear pivot point, an effective length of the bottom linkage being substantially equal to an effective length of the top linkage;
wherein the top-front, top-rear, bottom-front, and bottom-rear pivot points are positioned such that:
chain tension urges the top linkage and the bottom linkage to pivot in opposite directions;
bumps urge the top linkage and the bottom linkage to pivot in a same direction; and
the top and bottom linkage cooperate to direct a rear dropout in an arc characterized by chain growth throughout approximately a first 25% of suspension compression and characterized by an absence of chain growth throughout at least approximately a last 75% of suspension compression.

14. The twenty-nine inch wheel bicycle of claim 13, wherein an effective length of the bottom linkage is substantially equal to an effective length of the top linkage.

15. The twenty-nine inch wheel bicycle of claim 13, wherein the top linkage is angled approximately 20 degrees relative to a horizontal reference when a suspension including at least the top linkage and the bottom linkage is 0% compressed.

16. The twenty-nine inch wheel bicycle of claim 13, wherein the bottom linkage is angled approximately 30 degrees relative to a horizontal reference when a suspension including at least the top linkage and the bottom linkage is 0% compressed.

17. The twenty-nine inch wheel bicycle of claim 13, wherein the bottom linkage extends under a bottom bracket shell of the front triangle.

18. The twenty-nine inch wheel bicycle of claim 13, further comprising a shock operatively connected between the top linkage and a shock support of the front triangle.

* * * * *